United States Patent Office 2,858,395
Patented Oct. 28, 1958

2,858,395
AUTOMATIC RECLOSER

Alson Robert Harm, Verona, and Alvin W. Ogg, Churchill, Pa., and Kenneth L. Niebauer, Seattle, Wash., assignors to Westinghouse Electric Corporation, East Pittsburgh, Pa., a corporation of Pennsylvania Application August 24, 1956, Serial No. 606,009

9 Claims. (Cl. 200—89)

Our invention relates generally to circuit interrupters, and it has reference in particular to automatic reclosers.

Generally stated, it is an object of our invention to provide a polyphase recloser that is economical to manufacture and is reliable in operation.

More specifically, it is an object of our invention to provide in a polyphase recloser for using separate current responsive relays to open all poles, and for selectively connecting delay means thereto to delay predetermined operations of the relays.

Another object of our invention is to provide in a multiple pole recloser for effecting simultaneous opening of all poles by releasable means operated by current responsive relays, and for using a cumulatively advanceable counter member for effectively connecting delay means to delay operation of the relays.

Yet another object of our invention is to provide in a recloser for using current responsive relay means mounted under oil in a tank with the interrupter for effecting separation of the contacts, and for selectively connecting mechanically therewith delay means exterior of the tank to delay predetermined operations of the relay means in a sequence of closely successive operations.

Yet another object of our invention is to provide in an automatic recloser for mounting the circuit interrupter and current responsive relay therefor under oil in one tank and for using a push-pull rod mechanism for connecting thereto a spring operating mechanism and delay means so that sleeve type seals may be used to prevent gases from the interrupter tank from entering the mechanism enclosure.

It is an important object of our invention to provide in an automatic recloser for having a spring-biased operating mechanism for opening the recloser and for effecting release of the mechanism by current responsive means whose operation is normally unrestrained, and which are operatively connected to delay means on selected ones of a plurality of closely successive operations.

Other objects will in part be obvious and will in part be explained hereinafter.

In practicing our invention in accordance with one of its embodiments separable contacts are disposed in each of a plurality of separate interrupters and are supported in a tank in insulating oil from insulating bushings which are alined along one edge of a cover casting. The contacts are connected by means including a common shaft mounted in the tank on the casting, and motion thereof is transmitted to a spring operated opening mechanism, mounted in an adjacent tank secured to the same cover, by means of a push rod which has a sliding fit through a wall portion in the cover between the tanks. The operating mechanism is released by a common trip member actuated by push rods slideably disposed in the cover by any one of current responsive relays connected in series with each of the pairs of contacts. Delay means are mounted in the mechanism tank and are operatively connected to the relays by an integrator actuated by the operating mechanism. A motor is connected to reclose the contacts and store energy in the opening spring, and the circuit to the motor is interrupted by switches actuated by the mechanism, by the integrator after a predetermined number of closely successive openings, and by a shunt trip coil. A handle is provided for operating the mechanism to manually trip and close the contacts.

For a more complete understanding of the nature and scope of our invention, reference may be made to the following detailed description which may be read in connection with the accompanying drawings, in which.

Referring to Figs. 1A, 1B, 2 and 3, it will be seen that the polyphase recloser designated generally by the numeral 10, and which is an improvement over the recloser of copending application, Serial No. 587,691 of John B. McNeill et al., filed on May 28, 1956, comprises a substantially dished rectangular cover 12 having depending side portions 13 about the edges thereof with a flange 14 at the lower edge. Support brackets 11 are provided on the portions 13 at each end. The cover 12 is provided adjacent one edge with pairs of insulating bushings 15 and 16 for each of the three poles thereof, each pair being arranged transversely of the longitudinal axis of the cover, the pairs being spaced from each other in the longitudinal direction to provide insulated entrances for conductors 18 and 19 of each phase through openings 17 in the cover. Each of the bushings 16 supports at its lower end an interrupter 20 which is connected by means of a conductor 21 to a series type overcurrent trip element 22 supported at the lower end of the associated insulating bushing 15. The cover 12, which may be a casting, is provided with a depending longitudinal intermediate wall or rib 23 having a flange 24 along its lower edge cooperative with the flange 14 so as to provide for securing an interrupter tank or casing 25 to the flanges 14 and 24 about the interrupters and overcurrent trip means, so that the interrupters and trip means may be positioned in insulating oil having a level designated by the dot-dash line 27. A partition 26' is provided between the intermediate rib 23 and the side 13 adjacent one end to provide a hooded extension 28' and a flange 29 to permit a separate tank 29' to be secured to the casting 12 adjacent the tank 25 for enclosing an operating mechanism 30 shown in Figs. 1B and 2 and time delay means 32 shown in Figs. 1A and 3. The wall 23 is provided with longitudinally spaced apart offsets or pockets 26, 28, and 31 to provide for making mechanical connections in the operating mechanism between the tanks 25 and 29'.

Figure 4:
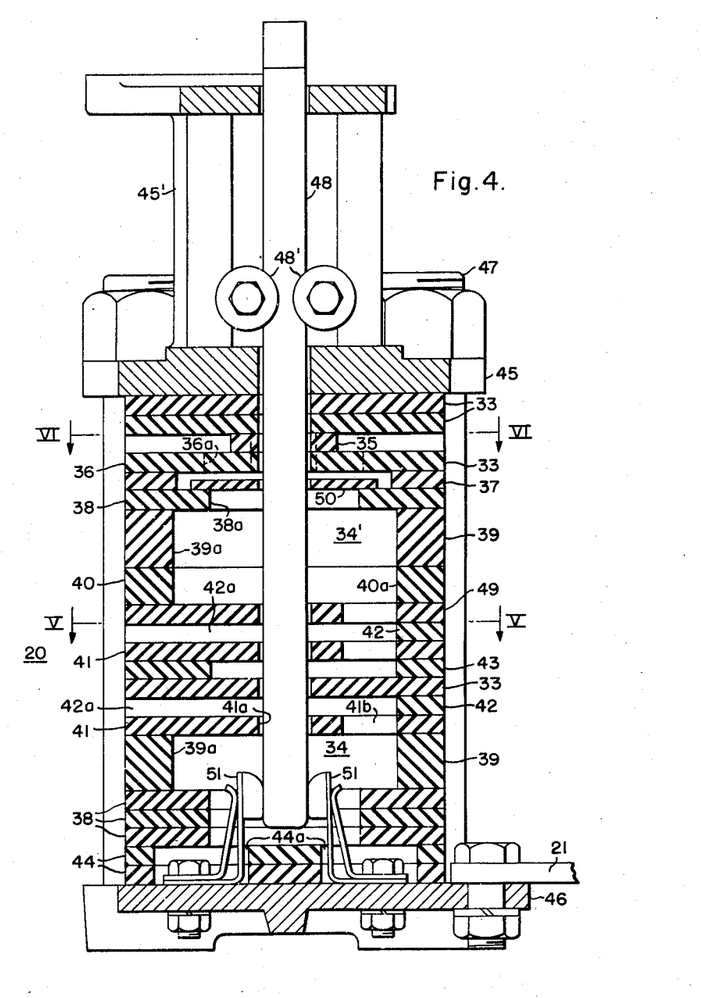
Fig. 4 is an enlarged cross-sectional view of the interrupter shown in Figs. 2 and 3.

Referring to Fig. 4, it will be seen that each interrupter 20 comprises main and auxiliary chambers 34 and 34' defined by a plurality of discs or plates 33, 35, 36, 37, 38, 39, 40, 41, 42, 43 and 44 of fiber or the like which are stacked between top and bottom support plates 45, 46 of metal being secured by means of bolts 47.

Figure 5:
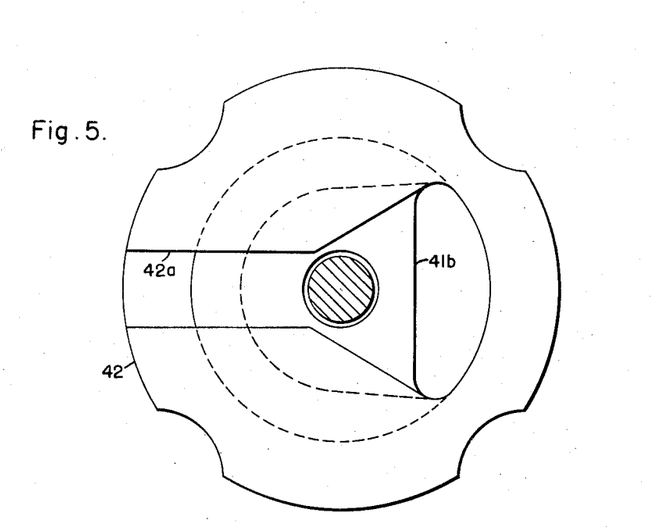
Figs. 5 and 6 are sectional views along the lines V—V and VI—VI of Fig. 4.
Figure 6:
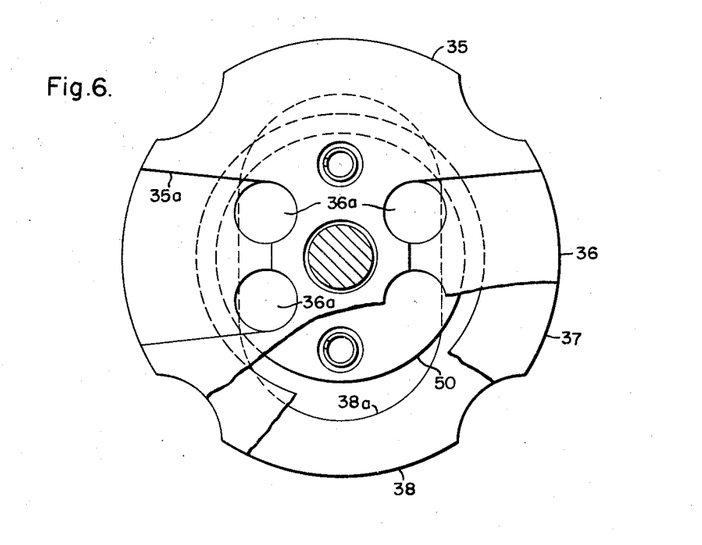

Plate 39 has a large central opening 39a defining the main arc chamber 34. Plates 41 have a central opening 41a for a movable contact rod 48 and offset openings 41b and are alternated with plates 42 having a tapered vent opening 42a, as shown in Fig. 5. This provides for a venting action upward through openings 41b and laterally through vents 42a to give a combined axial and cross blast action as an arc is drawn and rod 48 moves upwardly. Plates 39 and 40 have large central openings 39a and 40a to define the secondary arc chamber 34'. A valve plate 50 in conjunction with an elongated opening 38a in plate 38 above chamber 34' provides a final flushing action through holes 36a in plate 36 and out of vent openings 35a in plate 35 near the top of the stack as shown in Figs. 4 and 6. Resilient contact fingers 51 are secured to the support plate 46, being positioned in recesses 44a of plates 44, to engage rod 48. Rollers 48' mounted on an extension 45' of upper plate 45 make electrical contact with contact rod 48.

Figure 1A:
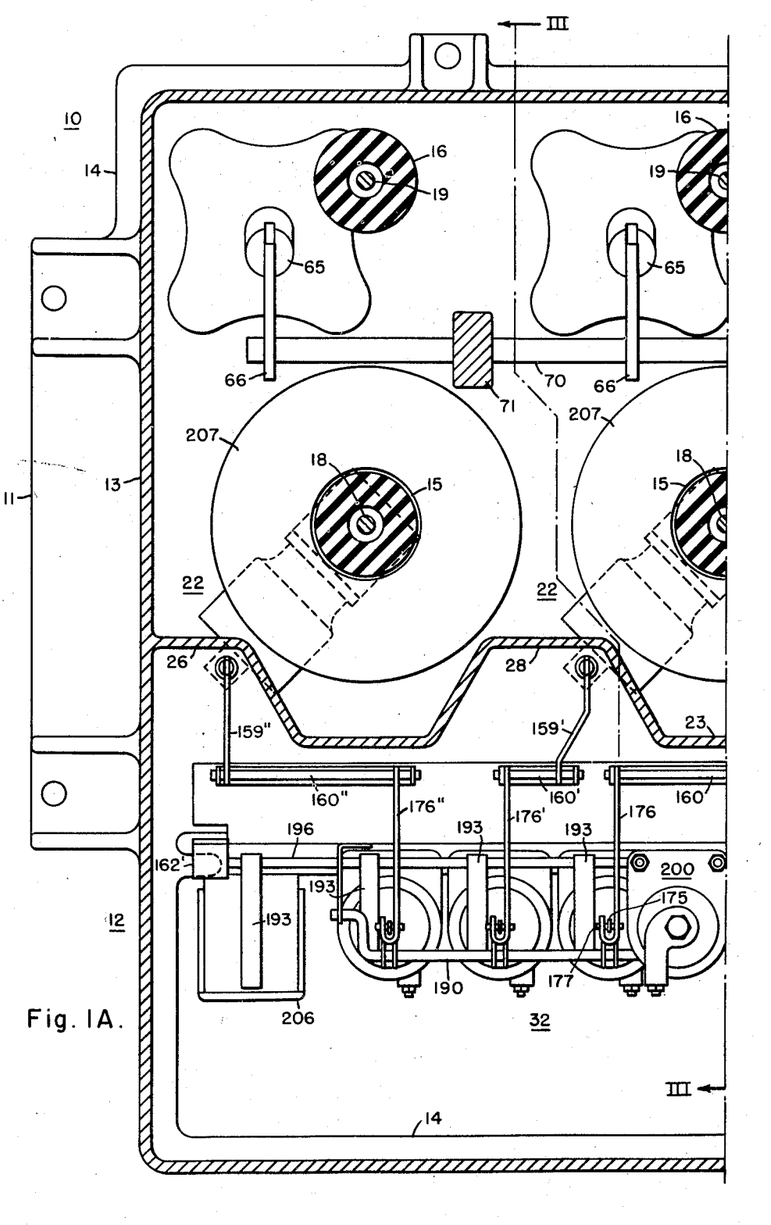
Figures 1A and 1B taken together are a partly sectioned plan view of the recloser.
Figure 1B:
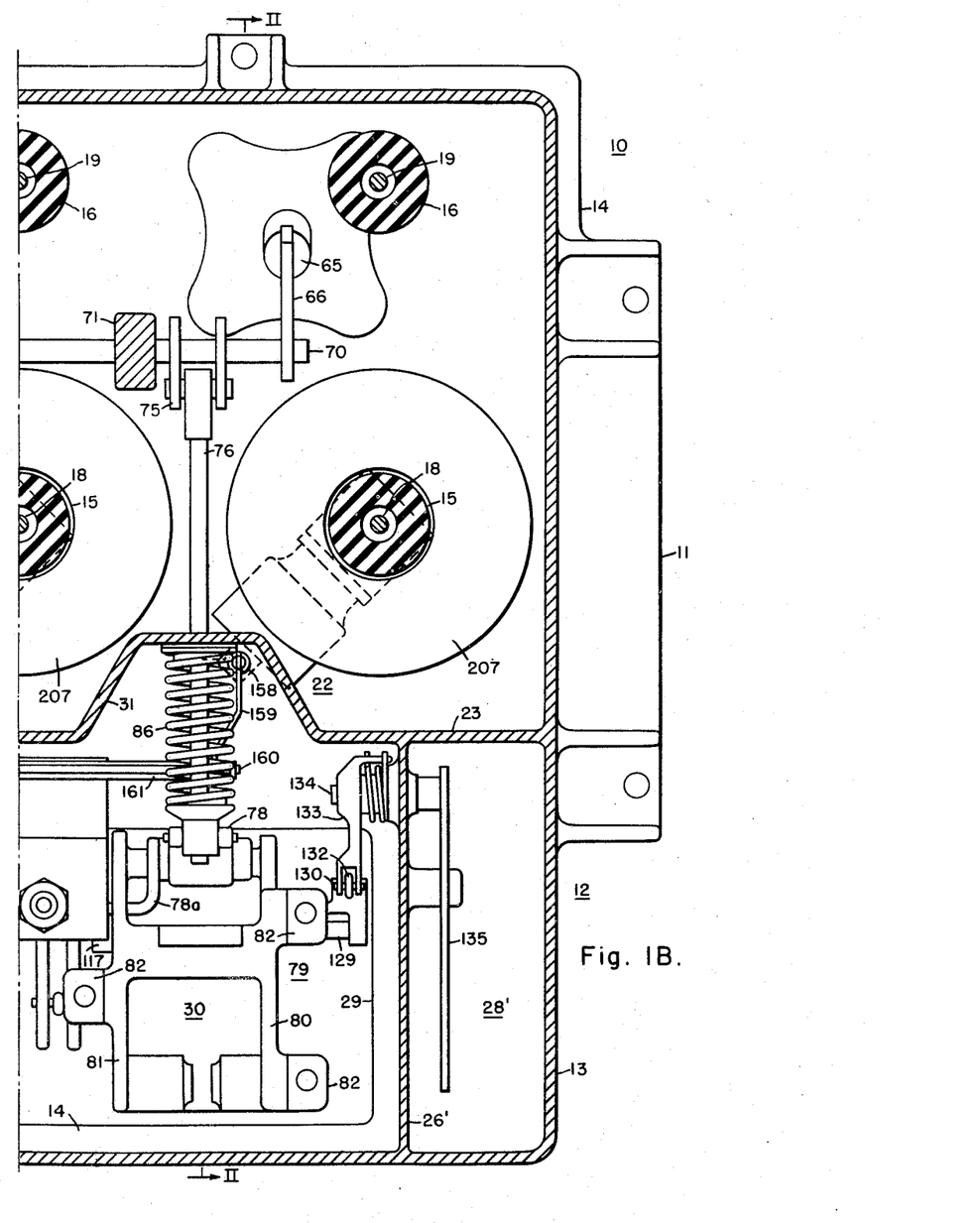
Figure 2:
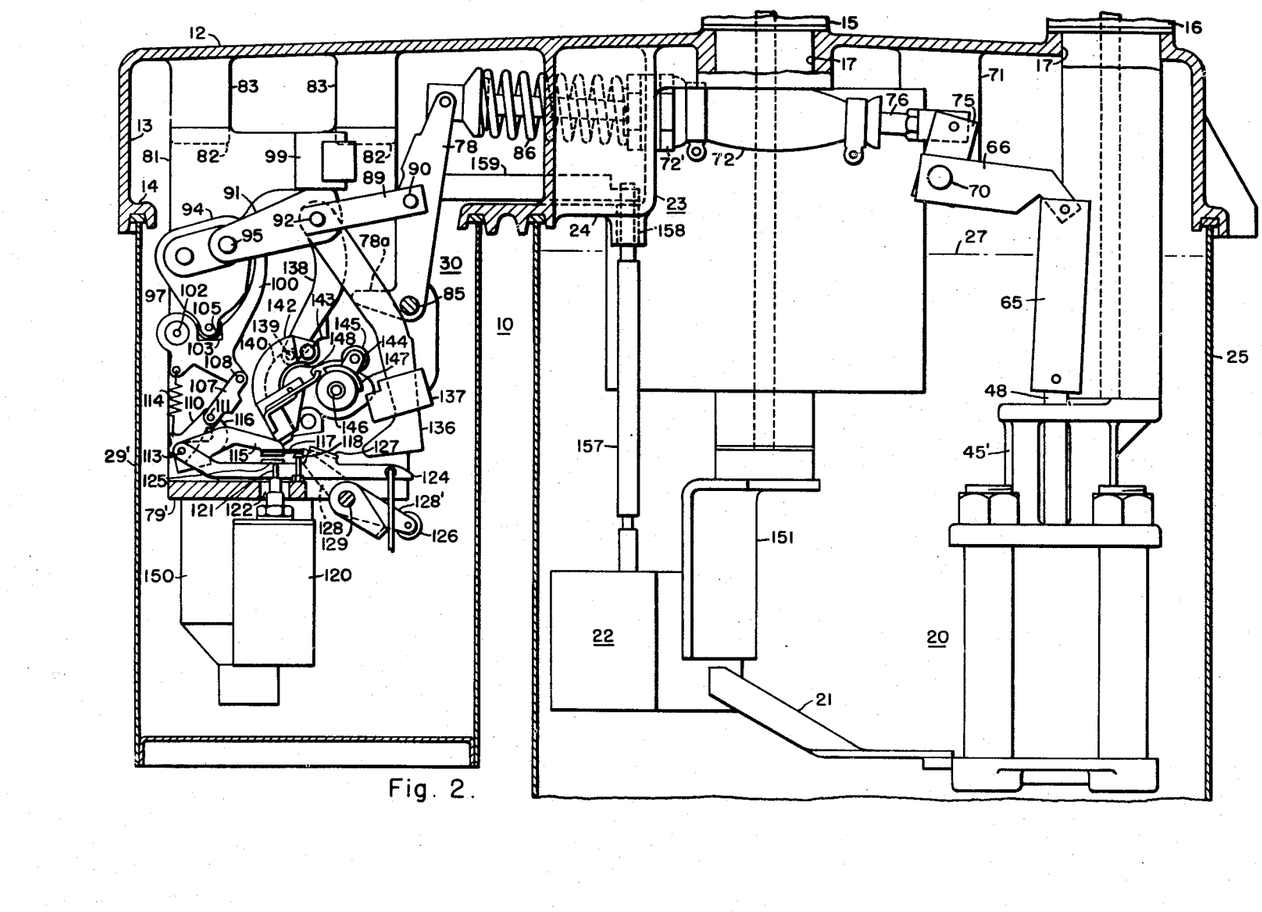
Fig. 2 is a sectional view taken along the line II—II of Fig. 1B.

Referring to Figs. 1A, 1B and 2, it will be seen that the contact rods 48 are connected by means of insulating links 65 to levers 66 secured to a shaft 70 rotatably mounted in suitable bearings positioned in bosses 71 depending from the cover casting. The shaft 70 is provided with a lever 75 which is positioned opposite pocket 31, and connected by means of a longitudinally movable link 76 to an operating lever 78 of the operating mechanism 30. A flexible sleeve 72 is secured at one end to link 76 and at the other end to a bushing 72' in the wall of recess 31 to provide a gas-tight seal.

The operating mechanism 30 is mounted in a frame 79 which, as shown in Figs. 1B and 2, is substantially U-shaped, having a base 79' with upstanding sides 80 and 81 which are spaced apart and are secured by means of flanges 82 to bosses 83 depending from the cover 12. The operating lever 78 is pivotally mounted on a shaft 85 mounted in frame 79, and is biased in a counterclockwise direction by means of a spring 86 mounted on link 76 in connection with the wall of recess 31. The lever 78 is releasably held in the closed position shown with the spring 86 compressed, by means of a toggle linkage comprising a link 89 connected to lever 78 by a pivot 90, a toggle link 91 pivotally connected to the link 89 by a common pivot 92, and a latch lever 94, which is connected to the toggle link 91 by a pivot 95 and is rotatably mounted on a shaft 97 supported in the frame 79.

The toggle linkage in the position shown has the toggle link 91 resting against a stop 99, with the pivots 92 and 95 in overcenter positions. The pivot 95 is maintained in this position by means of a latch 100 which is pivotally mounted in the frame 79 on a shaft 102, and has a recess 103 which receives a roller 105 on a lower portion of a latch lever 94. The latch 100 is maintained in the position shown, by a toggle linkage comprising a link 107 pivotally connected to the latch at 108, and a link 110 connected to link 107 by a pivot 111 and rotatably supported in the frame 79 on a fixed pivot 113. A spring 114 connects link 110 and latch 100. A trip lever 115 is rotatably mounted on the pivot 113 having a projection 116 for actuating the common pivot 111 overcenter and a laterally projecting pad 117 for operating the lever. An adjustable stop 118 normally engages pad 117 and holds the trip lever 115 in a position with the toggle levers 107 and 110 slightly overcenter.

When trip lever 115 is rotated counterclockwise projection 116 breaks the toggle arrangement of links 107 and 110, permitting latch 100 to rotate clockwise and release roller 105. Lever 94 rotates counterclockwise and pivot 95 moves further overcenter, causing pivot 92 to drop undercenter and permit spring 86 to rotate operating lever 78 counterclockwise, moving link 76 to the left so as to rotate shaft 70 counterclockwise to lift contact rods 48, and causing links 107 and 110 to reset to the positions shown.

A shunt trip solenoid 120 is secured to the bottom of the mechanism frame 79, having an armature with a projection 121 which passes through an opening 122 in the bottom of the frame. An auxiliary trip lever 124 is pivotally mounted on the same pivot 113 as lever 115, and is provided with a laterally extending tab 125 disposed to be engaged by the projecting trip member 121 of the shunt trip solenoid, and also actuate the trip lever 115.

The auxiliary trip lever has an additional lateral projection or flange 127 disposed to be engaged by a manual trip lever 128, which is rotatably mounted on a shaft 129 for engagement by a lever 128' for effecting manual tripping. As shown in Fig. 1B, the shaft 129 is rotatably mounted in the mechanism frame 79 and has secured thereto adjacent one end a lever 130 which is operatively connected by means of a link 132 to a lever 133 secured to a shaft 134 projecting through the end wall of the cover casting where there is secured thereto a handle 135 which is positioned beneath the hooded portion 28 of the casting where it is accessible from the outside for operation by means of a hook stick or the like. As shown in Figs. 1A and 1B, the shaft 70 is common to the interrupters of each phase so that operation thereof controls the contact rod for each phase simultaneously. An auxiliary switch 131 is mounted on the frame 79 by means of a bracket 119 and operated from the lever extension 78a by means of a connecting link 123.

Manual closing of the recloser is effected by pushing the handle 135 upwardly or in a clockwise direction so as to rotate the shaft 129 counterclockwise and thus cause roller 126 carried by lever 128' to engage the lower end of a closing link 136, which is pivotally connected to the toggle links 91 and 89 at pivot 92. The closing link 136 is slidably disposed in a guide collar 137 to maintain it in alignment for substantially vertical movement by the roller 126. This raises the pivot link 92 to substantially the position shown and forces the closing lever 78 to rotate in a clockwise direction, thus compressing spring 86, moving link 76 to the right to rotate shaft 70 clockwise, and moving the contact rod 48 downwardly reclosing the breaker contacts.

The breaker may also be reclosed automatically by means of a closing link 138 also connected to the common pivot 92 and has a pin 139 at its lower end which is free to move in an arcuate slot 140 in a guide member 142. The closing link 138 is provided with a shoulder 143 disposed to be engaged by a roller 145 carried by a lever 144 on a shaft 146 rotatably mounted on the sidewall 81 of the mechanism frame. A drum switch comprising a contact segment 147 mounted on shaft 146, and a stationary contact member 148 is utilized as a limit switch in controlling the operation of a motor 150, which is mounted on the bottom of the mechanism frame and connected by means of a worm gear drive (not shown) for rotating the shaft 146 to effect reclosing.

Figure 3:
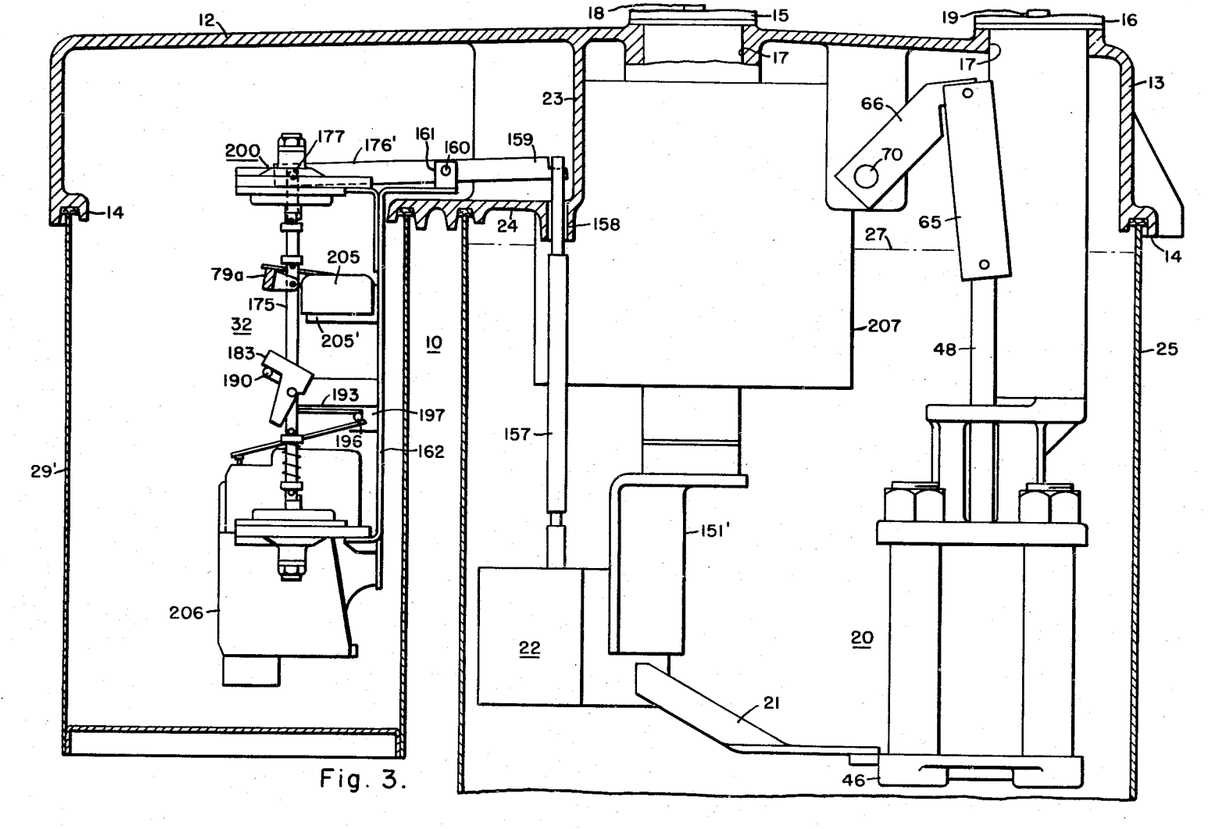
Fig. 3 is a sectional view taken along line III—III of Fig. 1A.
Figure 7:
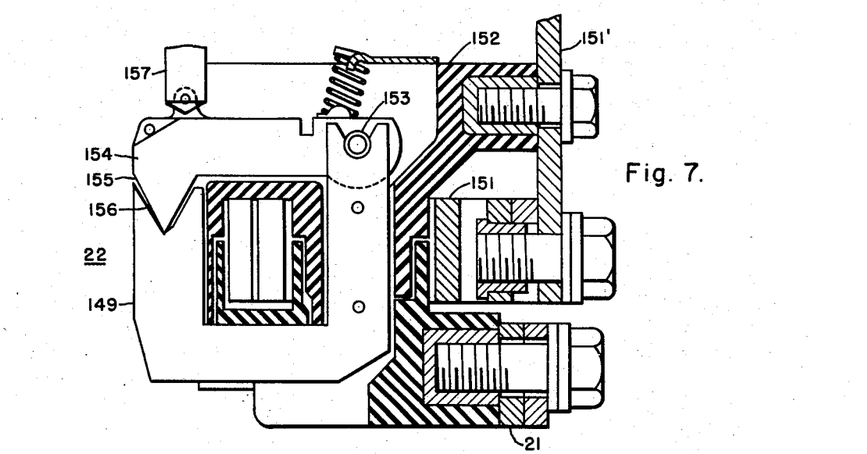
Fig. 7 is an enlarged view, partly in section, of the overcurrent trip relay shown in Figs. 2 and 3.

Referring to Fig. 7, it will be seen that the overcurrent trip element 22 of each pole comprises a substantially U-shaped magnetic core 149 provided with an operating coil 151 which is connected as shown in Figs. 2 and 3 in series with the conductors 18, 19 and the stationary contact 51 of the interrupter 20 by means of a support conductor 151' and the connecting conductor 21. The core 149 is secured to the support conductor 151 as by a molded body of insulation 152, and has pivotally mounted thereon as by pivot 153 an armature 154, which is normally positioned to provide an air gap between the pole faces 155 and 156 of the core and armature. The armature 154 is connected as shown in Fig. 3 by means of an operating rod 157 which moves longitudinally in an opening 158 in flange 24 of web 23, to arm 159, pivotally mounted as by means of a shaft 160 supported from the cover 12 by means of a bracket 161 on a panel 162 secured to the cover. The other pole units are provided with individual shafts 160' and 160" as shown in Fig. 8 supported by brackets 161' and 161" so that operation of their overcurrent relays 22 are individual to the particular pole units.

The control panel 162 is mounted in the mechanism tank 29, being secured to the cover 12 by means such as brackets 162' to a portion of flange 24 of the central web 23. On this panel are mounted the plurality of time delay means 32 individual to each of the interrupters 20 for controlling the opening thereof. As shown in Fig. 9, each of the time delay means 32 may comprise a diaphragm type dashpot having a dished main casing member 163 with a diaphragm 164 clamped thereto by means of a ring 165. The diaphragm is clamped between plates 166, 167 by means of a nut 168' secured to a central boss 168 on the plate 166. A resilient lost motion connecting device 169 including a spring 170 contained between upper and lower caps 171 by means of pins 172 and 172' secured to extensions 173 of boss 168 and to the lower end of rod 175, respectively, and sliding in slots 174 and 174' in rod 175 and extension 173 (as shown in Fig. 10) provides a resilient connection between the operating rod 175, which is connected to a tension crank lever 176, by a pivot 177, and the central boss 168. This provides for resilient lost motion, permitting immediate operation of the overcurrent trip relays 22 in the event of an excessive fault of, for example, about ten times normal current, thus modifying the normal inverse time-current characteristic thereof. As shown in Fig. 8, springs 178 are connected between a pin 179 adjustably mounted by means of a nut 180 and bracket 181 on panel 162 and tension lever 176 to adjust the current pickup value of the delay means. A control valve 182 shown in Fig. 9 provides for adjustably venting the space between the diaphragm 164 and casing 163 to vary the time delay movement of the central boss 168.

As shown in Fig. 9, an L-shaped releasable latch member 183 is provided, which in the position shown, provides a removable shoulder for pin 172 to prevent upward movement of pin 172 relative to member 173. The latch 183 is pivotally mounted on member 173 by pin 184, and when moved counterclockwise in Fig. 9, permits the pin 172 to move upwardly in slot 185 (Fig. 10) to permit link 175 to move freely without being impeded by the delay device 32. Operation of the several members 183 is provided by means of a common pivotal delay control member 190, which is pivotally mounted on the panel 162 as shown in Figs. 3 and 8 extends longitudinally thereof as shown in Figs. 1A and 1B.

Figure 8:
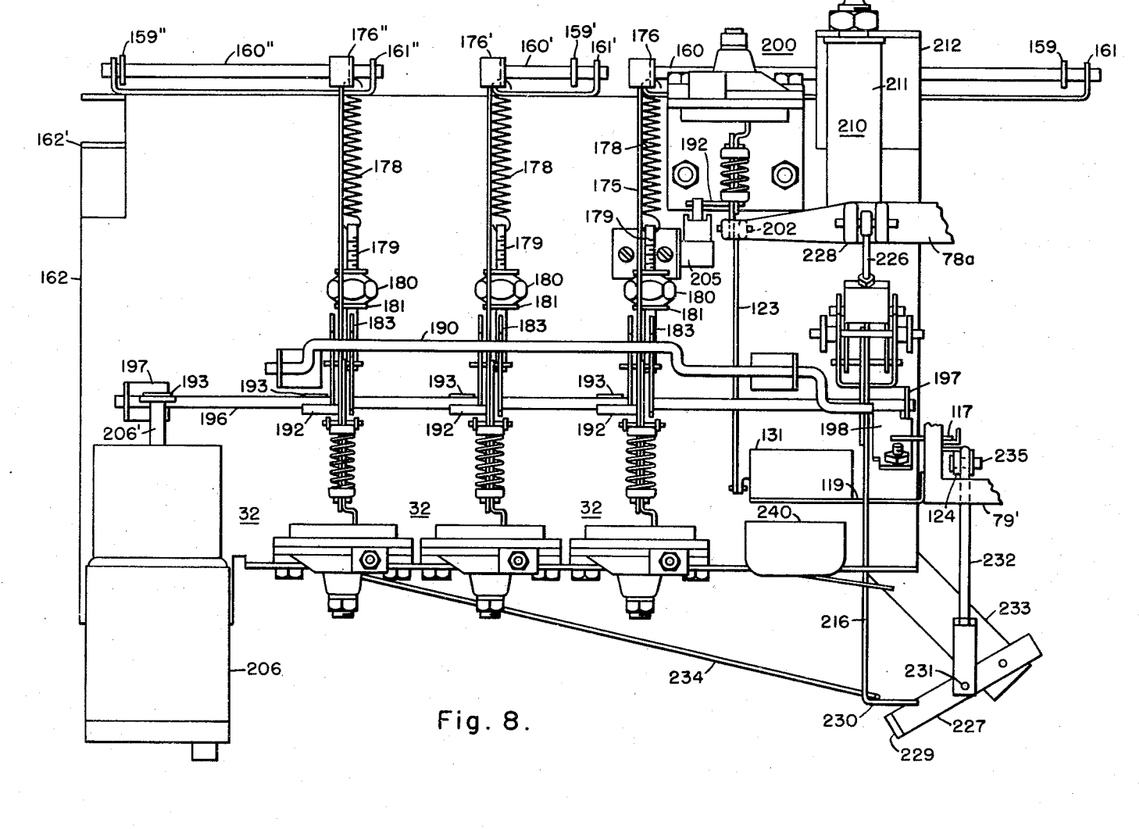
Fig. 8 is a front elevational view of the time delay control panel shown in Fig. 3.
Figures 9, 10, 11:
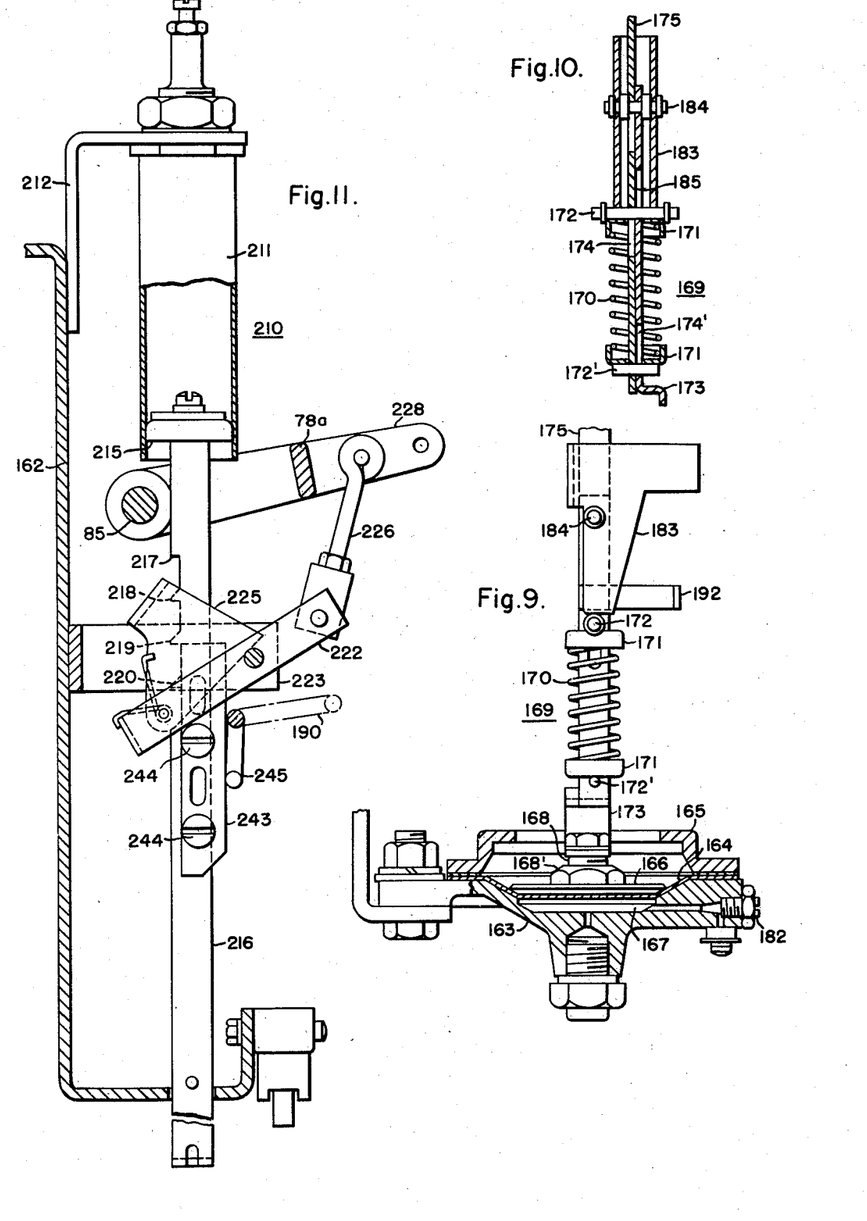
Fig. 9 is an enlarged elevational view partly in section of the time delay means of Fig. 3.
Fig. 10 is an enlarged partial view of the resilient connection of the time delay means.
Fig. 11 is an enlarged side elevational view of the counter shown in Fig. 8.

Tripping of the operating mechanism is effected by means of projecting arms 192 on the operating members 175 which engage levers 193 on a common trip bar or shaft 196 extending longitudinally of the panel as shown in Figs. 1A and 1B and in Fig. 8. The trip bar 196 is pivotally mounted on the panel by means of brackets 197, and extends longitudinally, having a trip extension arm 198 adjacent the operating mechanism 30 which engages the pad 117 when raised, and actuates the trip lever 115 to open the contacts. Manual tripping is effected by pulling downwardly on handle 135 to rotate shaft 129 clockwise, whereupon lever 123 lifts auxiliary trip lever 124 and trip lever 115.

Also mounted on the panel 162 is an air dashpot time delay device 200 as shown in Figs. 1A, 3 and 8, of substantially the same type as the delay devices 32, the delay movement being provided for operation in the downward direction. This time delay device is operatively connected to an extension 78a of lever 78, a pin 202, to effect by means of projecting shoulders 192' delayed operation of a limit switch 205 which is mounted on panel 162 by a bracket 205' and used to set up a reclosing circuit for the closing motor 150.

A ground fault trip device 206 substantially similar to the overcurrent trip device described in detail in Patent No. 2,691,709 which issued on October 12, 1954, to H. J. Lingal et al., but responsive to a lower value of current is mounted on the panel 162 as shown in Figs. 1A, 3, and 8 having a solenoid actuated trip member 206' for also operating an extension 193 of the common trip bar 196 to effect separation of the contacts in response to a ground fault current. Bushing type current transformers 207 are mounted over the lower ends of the insulating bushings 15 in the interrupter tank 25 for supplying current to the ground fault trip device 206.

In order to provide for locking the recloser open after a predetermined number of closely consecutive openings, an integrator or counter 210 is provided. The integrator comprises a substantially cylindrical body member 211 as shown in Figs. 1B, 8 and 11, having a bracket 212 by which it is secured to the panel 162, as in Fig. 11. An air dashpot delay piston 215 is positioned in cylinder 211, and is inverted for delaying downward movement or reset of an advanceable counter member 216 slidably disposed within the cylindrical body 211. The counter member 216 is provided with longitudinally spaced teeth 217, 218, 219 and 220. A lever 222 pivotally mounted on arms 223 extending from the panel 162 carries a pawl member 225 disposed to engage these flanges in succession when the lever 222 is rotated in a clockwise direction by means of operating links 226 which are connected to arms 228 projecting laterally from the extension 78a of mechanism operating lever 78. The operative connection of lever 228 and links 226 is shown in Figs. 8 and 11.

At the lower end of counter member 216 is a lateral projection 230 which is disposed to be engaged by a projection 229 of a lever 227 pivotally connected at 231 to a link 232 connected to the shunt trip lever 124 by a pivot 235. The lever 227 is pivotally mounted on panel 162 by means of a bracket 233, as shown in Fig. 8. In the event that the trip lever 124 is moved in a counterclockwise direction by either the shunt trip solenoid 120, or the manual trip lever 128, the link 227 will be raised by the auxiliary trip lever 124 to advance the counter member 216 immediately to the lockout position. An elongated spring 234 provides a soft resilient reset bias for the counter member. In the lockout position a limit switch 240, which is positioned to be engaged by the projection 230 after, for example, four closely successive opening operations of the recloser, or whether the recloser is tripped either manually or by the shunt trip solenoid 120, interrupts the operating circuit for the closing motor 150 to prevent reclosing, and thus locks the recloser open.

The counter member 216 has thereon an adjustably positioned cam member 243 secured by means of screws 244. The cam member 243 engages and positions a cam lever portion 245 of the control member 190 which is pivotally mounted on the panel 162, which as shown in Fig. 8 actuates the time delay control members 183 to disconnect the delay devices 32 and render them normally ineffective on the first one or two opening operations.

Figure 12:
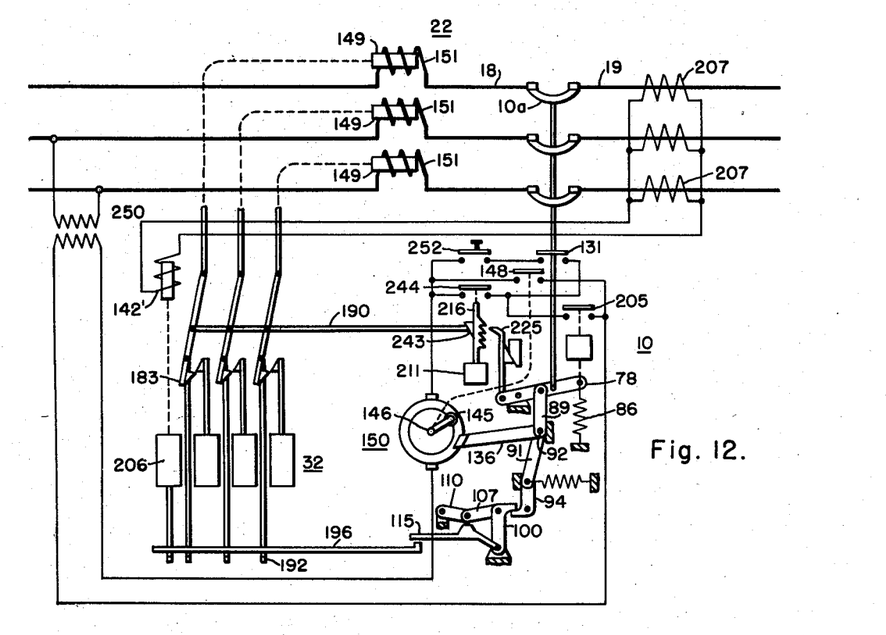
Fig. 12 is a diagrammatic view of the automatic recloser shown in Figs. 1A, 1B, 2 and 3 showing the circuit connections of the different elements.

Referring to Fig. 12, it will be seen that the recloser 10 is disposed to interrupt the circuit between conductors 18 and 19 of a three-phase circuit, the separable contacts being in this instance represented by the bridging type contact 10a in each instance instead of the single rod and finger type contacts 48 and 51 as hereinbefore described. The trip relays 22 are shown with their trip coils 151 connected in circuit with the conductors 18 for operating armatures 149 which are operatively connected by means of dotted lines to actuate the common trip bar 196 through time delay devices 32, which have operating members 183 for disconnecting the delay means to obtain substantially instantaneous action, with the lever 190 for operating them actuated by cam 243 to the initial position as shown.

Current transformers 207 are connected in parallel circuit relation to the trip coil 142' of the ground fault trip relay 206 for also operating the trip bar 196.

Operation of the trip bar 196 actuates trip lever 115, which breaks the toggle arrangement of levers 107 and 110 and disengages latch 100, to permit collapse of toggle levers 91 and 94 to the right, and hence permit toggle link pivot 92 to pass under center and provide for pivotal movement of operating lever 78 by its opening spring 86, which is compressed in the closed condition of the recloser. Operation of lever 78 actuates pawl 225 to advance the counter member 216 each time the breaker opens. A predetermined time after the breaker opens, a circuit is provided for the closing motor 150 through the lockout switch 240, which is normally closed, the time delayed reclosing switch 205, which is operated by the mechanism lever 78, and limit switch 148, which is actuated by motor 150.

Energization of the closing motor 150 from a source such as a control transformer 250 effects rotation of shaft 146 and causes roller 145 to engage closing link 136 and return the common pivot 92 of toggle links 89 and 91 to the overcenter position shown, thus causing rotation of the closing lever 78 in a direction to close the contacts. Shortly after the operating mechanism begins to move, the reset switch 205 opens and drum limit switch 148 closes to maintain the energizing circuit until the recloser is reclosed. After a predetermined number of such operations, the counter member 216 operates the limit switch 240 to interrupt the energizing circuit for the motor 150 and thus provide for locking the counter in the open position. Reclosing may then be effected either by manual operation of the mechanism or by means of a control switch 252 which parallels and bypasses the lockout switch 240. Since the pawl 225 holds the counter member 216 advanced, when the recloser is locked open, only a single operation is required to again lock the recloser open when it is reclosed following lockout.

From the above description and the accompanying drawings, it will be apparent that we have provided a polyphase automatic recloser which is compact and efficient in operation. Since the contacts are biased open by a spring and held closed by a releasable toggle latch mechanism, tripping of the breaker is reliable and highly accurate, since the only force required is that necessary to release the toggle mechanism. Reclosing is effected by means of a motor which requires only a relatively small current for the torque obtainable. Since the three poles are mechanically interconnected, simultaneous operation thereof is insured. By effecting tripping through a delayed overcurrent relay, and having the delay means disconnected from the relay, initial operation of the relay as well as actual opening operation of the breaker is unimpeded, and fast separation of the contacts is obtained. By utilizing bushing type current transformers for ground fault tripping, no extra space for high voltage current transformers is required, since the same bushings serve a double purpose. By utilizing delay means of the air dashpot type, consistently accurate timing is obtained over a wide range of temperature conditions. Separate tanks for the interrupters and the mechanism permit the air dashpot time delay devices to be maintained clear of any possibility of oil splashing, and yet both the interrupter and the overcurrent relay are oil immersed, insuring the maximum insulation and arc interruption. By arranging the interrupters and current relays in the manner shown it is possible to use longitudinally movable push rods to connect the operating mechanism, contacts, overcurrent relays and time delay means. This facilitates sealing the mechanical connections between the tanks and minimizes the risk of passage of explosive gases therebetween. Since the counter is operated to the lockout position when the recloser is tripped either manually or by the shunt trip a single operation to lockout results when the recloser is reclosed after lockout for any reason.

Since certain changes may be made in the above described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. In a circuit interrupter, a plurality of pairs of separable contacts, an operating mechanism for said contacts, stored energy means operable to actuate the mechanism to open said contacts, releasable means preventing operation of said stored energy means, current actuated means responsive to current above a predetermined value operable to actuate said releasable means, delay means operable to delay operation of said current actuated means and normally disconnected from the current actuated means, and means actuated by the stored energy means to effect connection of the delay means to the current actuated means.

2. A circuit interrupter comprising, a plurality of pairs of separable contacts, operating mechanism for effecting separation of said contacts, operating means including a spring biasing the operating means to separate said contacts simultaneously, releasable means preventing such operation of the operating mechanism, current actuated means operated by currents through said contacts to effect release of the releasable means, delay means for each of the current actuated means and normally disconnected from the current actuated means, and a counter cumulatively advanceable to effect connection of the delay means to the current actuated means on a predetermined one of a series of two or more closely successive operations of the operating means.

3. In an automatic recloser, a plurality of pairs of separable contacts, operating mechanism for each of said pairs, a common operating means for said mechanisms including a spring biasing the mechanisms to separate said pairs of contacts, releasable means preventing operation of the spring to separate the contacts, a current actuated relay individual to each pair of contacts operable to effect release of said releasable means in response to current through its associated contacts in excess of a predetermined value, delay means operable to delay operation of each relay and normally disconnected from each relay, means operable to actuate the operating means to close the contacts following separation, counting means actuated by the operating means, means actuated by the counting means to connect the delay means to the relays to render the delay means operable, and means operated by the counting means to render the closing means ineffective after a predetermined count of closely successive openings.

4. In a recloser, separable contacts, an operating mechanism for said contacts, operating means including a lever connected to the mechanism and biased by a spring to effect separation of said contacts, releasable means opposing movement of said lever to separate the contacts, a current actuated relay having a coil connected in series with the contact and a movable armature connected to effect release of the releasable means, delay means operable to delay operation of the relay and normally disconnected from the relay, and means actuated by the operating means operable to connect the delay means to said armature to delay movement of said armature on predetermined ones of a series of operations.

5. A recloser comprising, separable contacts, an operating mechanism for said contacts, operating means including a spring biasing the mechanism to separate the contacts and releasable means preventing movement of the operating means to separate said contacts, current actuated means operable to effect release of the releasable means in response to currents above a predetermined value, delay means operable to delay such operation of the current actuated means and normally disconnected from the current actuated means, reclosing means operable to actuate the operating means to close the contacts following separation, a lockout switch normally providing an operating circuit for the reclosing means when the contacts separate, and a counter cumulatively advanced by closely successive operations of the recloser to effect connection of the delay means and the current actuated means and to open the lockout switch after a predetermined number of such operations.

6. In a recloser; separable contacts; an operating mechanism for said contacts; operating means including a lever connected to the mechanism, a spring biasing the lever to effect separation of the contacts, latch means preventing movement of the lever to effect such separation, and reclosing means operable to actuate the lever against the bias of said spring to reclose the contacts following a separation; current actuated means operable in response to current above a predetermined value through said contacts to release said releasable means; delay means normally disconnected from the current actuated means; means releasably connecting the delay means and the current actuated means; and counting means actuated by operation of the recloser to effect operation of the releasable connecting means to connect the delay means and current actuated means on selected ones of a series of closely successive operations.

7. In a recloser, separable contacts, an operating mechanism for actuating said contacts, operating means including a spring biasing the mechanism to separate said contacts, releasable means preventing movement of said means under said bias, current actuated means operated by a current above a predetermined value to effect release of said releasable means, means including a motor connected to actuate the operating means to reclose the contacts when they separate, delay means normally disconnected from the current actuated means, means for connecting the delay means and the current actuated means including a releasable member operable to connect the delay means and current actuated means, a lockout switch connected in circuit with the motor, and a counter advanced by closely successive operations of the recloser to operate the releasable connecting means on one operation and open the lockout switch after a predetermined number of operations.

8. In a recloser, separable contacts, a tank disposed about said contacts, a cover for said tank having a top portion with a depending wall along at least one edge, an extending top portion beyond said wall, and a flange on the lower edge of the depending wall extending in the direction of the extending top portion, insulating bushings mounted in said top portion with one of the bushings being adjacent the depending wall and one adjacent an opposite edge, means supporting the contacts from the insulator adjacent the opposite edge, operating means for separating the contacts including a longitudinally movable rod slidably passing through the depending wall, operating means supported from the extending top portion including a lever connected to the operating means and a spring biasing the operating means to open the contacts, releasable means holding the operating means against said bias, delay means supported adjacent the operating means outside the tank, current actuated means supported in the tank from the insulating bushing adjacent the wall, means connecting the delay means and current actuating means including a longitudinally movable rod slidably passing through the flange on the depending wall and releasable connecting means mounted adjacent the delay means, and a counter actuated by the operating means to actuate the releasable connecting means.

9. In an automatic recloser, a tank having an insulating fluid therein, a cover for said tank having an extension, insulating bushings mounted in said cover above the tank, an interrupter supported from one of the bushings having a chamber with a contact mounted in a chamber and a movable contact rod moving through a central passage in the interrupter, baffles providing a cross-flow of fluid immediately above said chamber, an operating mechanism connected to the rod, operating means including a spring actuated lever operable to actuate the mechanism to separate the contacts, releasable means preventing operation of the lever, current actuated means supported in the fluid from the other of the bushings and connected in series with said contacts, delay means, releasable connecting means connecting the delay means and current actuated means, reclosing means including a motor actuating the operating means to close the contacts, means including a lockout switch normally providing an operating circuit for the motor when the contacts separate, a cumulatively advanceable counter member actuated by closely successive operations of the operating means, to open the lockout switch, and means normally releasing the releasable connecting means actuated by the counter member to connect the delay means and current actuated means.

References Cited in the file of this patent

UNITED STATES PATENTS

| | | |
|---|---|---|
| 2,411,366 | Chubbuck | Nov. 19, 1946 |
| 2,567,411 | Van Ryan | Sept. 11, 1951 |
| 2,692,313 | Wallace et al. | Oct. 19, 1954 |
| 2,748,221 | Edwards et al. | May 29, 1956 |

Disclaimer 2,858,395.—*Alson Robert Harm*, Verona, *Alvin W. Ogg*, Churchill, Pa., and *Kenneth L. Niebauer*, Seattle, Wash. AUTOMATIC RECLOSER. Patent dated Oct. 28, 1958. Disclaimer filed Mar. 27, 1962, by the assignee, *Westinghouse Electric Corporation*.

Hereby enters this disclaimer to claims 1, 3, 4 and 6 of said patent.

[*Official Gazette May 8, 1962.*]